US008423364B2

(12) United States Patent
Yu et al.

(10) Patent No.: US 8,423,364 B2
(45) Date of Patent: *Apr. 16, 2013

(54) GENERIC FRAMEWORK FOR LARGE-MARGIN MCE TRAINING IN SPEECH RECOGNITION

(75) Inventors: Dong Yu, Kirkland, WA (US); Alejandro Acero, Bellevue, WA (US); Li Deng, Sammamish, WA (US); Xiaodong He, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 952 days.

This patent is subject to a terminal disclaimer.

(21) Appl. No.: 11/708,440

(22) Filed: Feb. 20, 2007

(65) Prior Publication Data

US 2008/0201139 A1   Aug. 21, 2008

(51) Int. Cl.
*G10L 15/14* (2006.01)
*G10L 15/00* (2006.01)
*G10L 15/06* (2006.01)

(52) U.S. Cl.
USPC .................... 704/256; 704/231; 704/243

(58) Field of Classification Search ......... 704/231, 704/233–234, 240, 256
See application file for complete search history.

(56) References Cited

U.S. PATENT DOCUMENTS

| 5,737,489 | A | * | 4/1998 | Chou et al. | 704/256 |
| 5,754,681 | A | * | 5/1998 | Watanabe et al. | 382/159 |
| 5,839,105 | A | * | 11/1998 | Ostendorf et al. | 704/256 |
| 6,076,053 | A | | 6/2000 | Juang et al. | 704/236 |
| 6,112,175 | A | * | 8/2000 | Chengalvarayan | 704/256.5 |
| 6,125,345 | A | * | 9/2000 | Modi et al. | 704/240 |
| 6,374,220 | B1 | | 4/2002 | Kao | 704/255 |
| 6,490,555 | B1 | | 12/2002 | Yegnanarayanan et al. | 704/231 |
| 6,799,162 | B1 | * | 9/2004 | Goronzy et al. | 704/244 |
| 7,219,055 | B2 | * | 5/2007 | Lucke | 704/234 |
| 7,617,103 | B2 | * | 11/2009 | He et al. | 704/256 |

(Continued)

FOREIGN PATENT DOCUMENTS

WO   WO 0133551 A1   5/2001

OTHER PUBLICATIONS

Li, "Large Margin Hidden Markov Models for Speech Recognition", Sep. 2005, M.S. thesis, Dept. of Computer Science nad Engineering, york University, pp. 1-109.*

(Continued)

*Primary Examiner* — Richemond Dorvil
*Assistant Examiner* — Olujimi Adesanya
(74) *Attorney, Agent, or Firm* — Westman, Champlin & Kelly, P.A.

(57) ABSTRACT

A method and apparatus for training an acoustic model are disclosed. A training corpus is accessed and converted into an initial acoustic model. Scores are calculated for a correct class and competitive classes, respectively, for each token given the initial acoustic model. Also, a sample-adaptive window bandwidth is calculated for each training token. From the calculated scores and the sample-adaptive window bandwidth values, loss values are calculated based on a loss function. The loss function, which may be derived from a Bayesian risk minimization viewpoint, can include a margin value that moves a decision boundary such that token-to-boundary distances for correct tokens that are near the decision boundary are maximized. The margin can either be a fixed margin or can vary monotonically as a function of algorithm iterations. The acoustic model is updated based on the calculated loss values. This process can be repeated until an empirical convergence is met.

19 Claims, 6 Drawing Sheets

U.S. PATENT DOCUMENTS

| | | | |
|---|---|---|---|
| 7,702,631 B1* | 4/2010 | Basu et al. | 707/999.006 |
| 2003/0171931 A1* | 9/2003 | Chang | 704/275 |
| 2004/0190732 A1 | 9/2004 | Acero et al. | 381/94.1 |
| 2004/0199384 A1 | 10/2004 | Hong | 704/233 |
| 2004/0249628 A1 | 12/2004 | Chelba et al. | 704/4 |
| 2004/0267530 A1 | 12/2004 | He et al. | 704/256 |
| 2005/0021337 A1* | 1/2005 | Kwon | 704/256 |
| 2006/0069678 A1* | 3/2006 | Chou et al. | 707/5 |
| 2006/0115145 A1* | 6/2006 | Bishop et al. | 382/155 |
| 2006/0167784 A1* | 7/2006 | Hoffberg | 705/37 |
| 2006/0195321 A1 | 8/2006 | Deligne et al. | 704/257 |
| 2007/0083373 A1* | 4/2007 | Liu et al. | 704/256.2 |

OTHER PUBLICATIONS

McDermott et al "A Parzen Window Based Derivation of Minimum Classification error From the Theoretical Bayes Classification risk", 2002, in Proc. ICSLP 2002, pp. 1-4.*

LeCun et al, "A Tutorial on Energy-based Learning" Aug. 19, 2006, MIT Press, 2006, pp. 1-59.*

He et al, "Minimum Classification Error (MCE) Model Adaptation of Comtinuous Density HMMs", 2003, in Proc. ICASSP 2003, vol. 1, pp. 1-4.*

Li et al, "Large Margin HMMs for Speech Recognition" 2005, IEEE Int'l Conf. on Acoustic, speech, & Signal Processing, vol. 5, pp. 1-4.*

F.Sha et al, Comparison of Large Margin Training to Other Discriminative Methods for Phonetic recognition by Hidden Markov Models, 2007, <http://www.cs.berkely.edu/~feisha/pubs/icassp2007.pdf>, pp. 1-4.*

Juang et al, "Minimum Classification Error Rate Methods for Speech Recognition", 1997, IEEE Transactions of Speech and Audio processing, vol. 5, No. 3, pp. 257-265.*

Altun et al, "Large Margin Methods for label Sequence Learning", 2003, <http://www.int.tu-darmstadt.de/publications/AltunHofmannEuroSpeech2003.pdf>, pp. 1-4.*

Sha et al, "Large Margin Hidden Markov Models for Automatic Speech Recognition", 2007, <http://www.cs.berkely.edu/~feisha/pubs/nips2006.pdf>.*

Yu et al, Use of incrementally regulated Discriminative Margins in MCE Training for Speech Recognition, Sep. 2006, Interspeech 2006—ICSLP, pp. 2418-2421.*

Li et al, "Language Recognition Based on Score Distribution Feature Vectors and Discriminative Classifier Fusion," Speaker and Language Recognition Workshop, 2006. IEEE Odyssey 2006: the, vol., no., pp. 1-5, Jun. 28-30, 2006.*

Paliwal et al, "Minimum classification error training algorithm for feature extractor and pattern classifier in speech recognition", Eurospeech '95, Vo. 1, 1995, pp. 541-544.*

F. Sha et al., "Comparison of Large Margin Training to Other Discriminative Methods for Phonetic Recognition by Hidden Markov Models," http://www.cs.berkeley.edu/~feisha/pubs/icassp2007.pdf, 2007, pp. 1-4.

X. Li et al., "Large Margin HMMs for Speech Recognition," http://ieesplore.ieee.org/iel5/9711/30654/01416353.pdf, Acoustics, Speech, & Signal Processing, 2005, IEEE Int'l. Conf., vol. 5, Mar. 2005, V-513-V-516.

B-H. Juang et al., "Minimum Classification Error Rate Methods for Speech Recognition," http://ieexplore.ieee.org/iel4/89/12354/00568732.pdf?isNumber=, IEEE Transactions of Speech and Audio Processing, vol. 5, No. 3, May 1997, pp. 257-265.

Y. Altun et al., "Large Margin Methods for Label Sequence Learning,", 2003, http://www.int.tu-darmstadt.de/publications/AltunHofmann-EuroSpeech2003.pdf, pp. 1-4.

F. Sha et al., "Large Margin Hidden Markov Models for Automatic Speech Recognition," http://www.cs.berkeley.edu/~feisha/pubs/nips2006.pdf, Advances in Neural Information Processing Systems 10, 2007, pp. 1-8.

* cited by examiner

GENERIC FRAMEWORK FOR LARGE-MARGIN MCE TRAINING IN SPEECH RECOGNITION

BACKGROUND

Discriminative training has been a prominent theme in recent speech recognition research and system development. The essence of discriminative training algorithms (for example, minimum classification error (MCE) training algorithms) is the adoption of various cost functions that are directly or indirectly related to the empirical error rate found in the training data. These cost functions serve as objective functions for optimization, and for a related empirical error rate that may either be calculated at a sentence string level, at a super-string level, or at a sub-string level, e.g., at an word/phone token level.

For example, one approach that has been found during research is that when the empirical training error rate is optimized through the use of a classifier or recognizer, only a biased estimate of the true error rate is obtained. The size of this bias depends on the complexity of the recognizer and the task (as quantified by the Vapnik Chervonenkis (VC) dimension). Analysis and experimental results have shown that this bias can be quite substantial even for a simple Hidden Markov Model (HMM) recognizer applied to a simple single digit recognition task. Another key insight from the machine learning research suggests that one effective way to reduce this bias and improve generalization performance is to increase "margins" in training data. That is, making correct samples be classified well away from a decision boundary. Thus, it is desirable to use such large margins for achieving lower test errors even if this may result in higher empirical errors in training. Most previous approaches to discriminative learning techniques and speech recognition have focused on the issue of empirical error rate. Recently, one approach, which has focused on the issue of margins, has shown some positive results when utilized for small automatic speech recognition tasks. However, similar success has not been demonstrated in connection with large-scale speech recognition.

The discussion above is merely provided for general background information and is not intended to be used as an aid in determining the scope of the claimed subject matter.

SUMMARY

A method and apparatus for training an acoustic model are disclosed. Depending on the type of acoustic model being trained, (that is, customized to each user or general) a training corpus is provided to a training model. This training corpus can be either commercially available training corpuses or can be generated by the user. This training corpus is then accessed and an initial acoustic model is created using the training set. Once an initial acoustic model is created, scores are calculated for each token in a correct class and competitive classes. Also, a sample-adaptive window bandwidth is calculated for each training token. From the calculated scores and the sample-adaptive window bandwidth values, loss values can be calculated based on a loss function. The loss function, which may be derived from a Bayesian viewpoint, can include a margin value that moves a decision boundary for empirical convergence. The margin can either be a fixed margin or can vary depending on a number of iterations performed. The acoustic model is updated based on the calculated loss values. This process can be repeated until such time as an empirical convergence is met.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
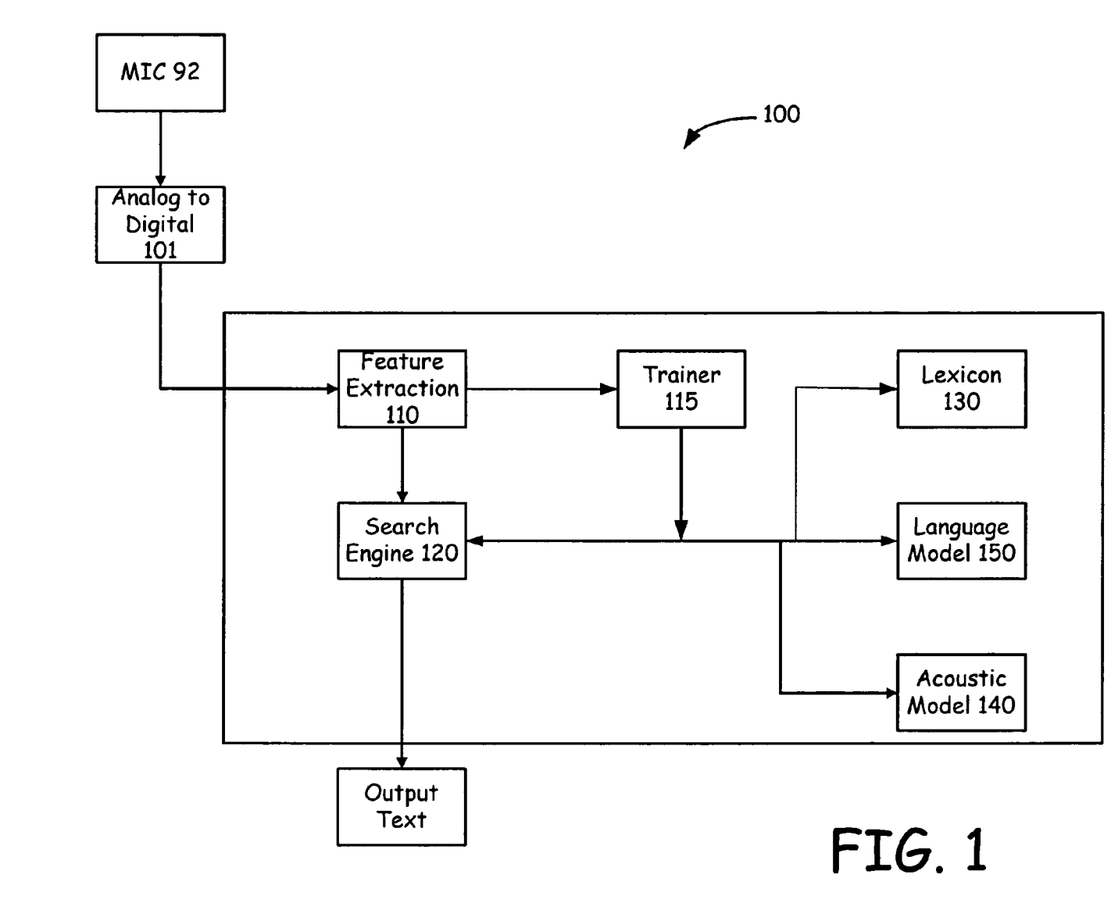
FIG. 1 is a block diagram of an exemplary speech recognition system.

FIG. 1 is a block diagram illustrating an exemplary speech recognition system 100 according to one embodiment. The speech recognition system 100 includes a microphone 92, an analog-to-digital (A/D) converter 101, a training module 115, a feature extraction module 110, a lexicon storage module 130, an acoustic model 140, a tree search engine 120, and a language model 150. It should be noted that the entire system 100, or part of speech recognition system 100, can be implemented on any computer system or across multiple computer systems. For example, microphone 92 can preferably be provided as an input device to the computer through an appropriate interface, and through the A/D converter 101.

The training module 115 and the feature extraction module 110 can either be hardware modules in the computer system, or software modules stored in any information storage device. This information is accessible by a processing unit on the computer or any other suitable processor. In addition, the lexicon storage module 130, the acoustic model 140, and the language model 150 are also preferably stored in any of the memory devices contained on the computer. Furthermore, the tree search engine 120 is implemented in a processing unit (which can include one or more processors) or can be performed by a dedicated speech recognition processor employed by the computer.

In the embodiment illustrated in FIG. 1, during speech recognition, speech is provided as an input into system 100 in the form of an audible voice signal by the user to the microphone 92. The microphone 92 converts the audible speech signal into an analog electronic signal which is provided to the A/D converter 101. The A/D converter 101 converts the analog speech signal into a sequence of digital signals, which is provided to the feature extraction module 110. In one embodiment, the feature extraction module 110 is a conventional array processor that performs spectral analysis on the digital signals and computes a magnitude value for each frequency band of a frequency spectrum. The signals are, in one illustrative embodiment, provided to the feature extraction module 110 by the A/D converter 101 at a sample rate of approximately 16 kHz.

The feature extraction module 110 divides the digital signal received from the A/D converter 101 into frames that include a plurality of digital samples. In one embodiment, each frame is approximately 10 milliseconds in duration. The frames are then encoded by the feature extraction module 110 into feature vectors reflecting the spectral characteristics for a plurality of frequency bands. In the case of discrete and semi-continuous Hidden Markov Modeling, the feature extraction module 110 also encodes the feature vectors into one or more code words using vector quantization techniques and a code book derived from training data. Thus, the feature extraction module 110 provides, at its output, the feature vectors (or code words) for each spoken utterance. The feature extraction module 110 provides the feature vectors (or code words) at a rate of one feature vector (or code word) approximately every 10 milliseconds.

Output probability distributions are then computed against Hidden Markov Models (HMMs) using the feature vectors (or code words) of the particular frame being analyzed. These probability distributions are later used in executing a Viterbi or similar type of processing technique.

Upon receiving the code words from the feature extraction module 110, the tree search engine 120 accesses information stored in the acoustic model 140. The model 140 stores acoustic models such as HMMs which represent speech units to be detected by the speech recognition system 100. In one embodiment, the acoustic model 140 includes the senone tree associated with each Markov state in a HMM. The HMM represents, in one illustrative embodiment, phonemes. Based on the senones in the acoustic model 140, the tree search engine 120 determines the most likely phonemes represented by the feature vectors (or code words) received from the feature extraction module 110 and hence representative of the utterance received from the user of the system.

The tree search engine 120 also accesses the lexicon stored in the module 130. The information received by the tree search engine 120 based on its accessing of the acoustic model 140 is used in searching the lexicon storage model 130 to determine a word that most likely represents the code words or feature vectors received from the feature extraction module 110. Also, the search engine 120 accesses the language model 150, which is illustratively a 60,000 word trigram language model, derived from the North American Business News Corpus. The language model 150 is also used in identifying the most likely word represented by the input speech. The most likely word is provided as output text of the speech recognition system 100.

Although described herein where the speech recognition system 100 uses HMM modeling and senone trees, it should be understood that the speech recognition system 100 can take many forms, and all that is required is that it provide as an output the text spoken by the user.

Figure 2:
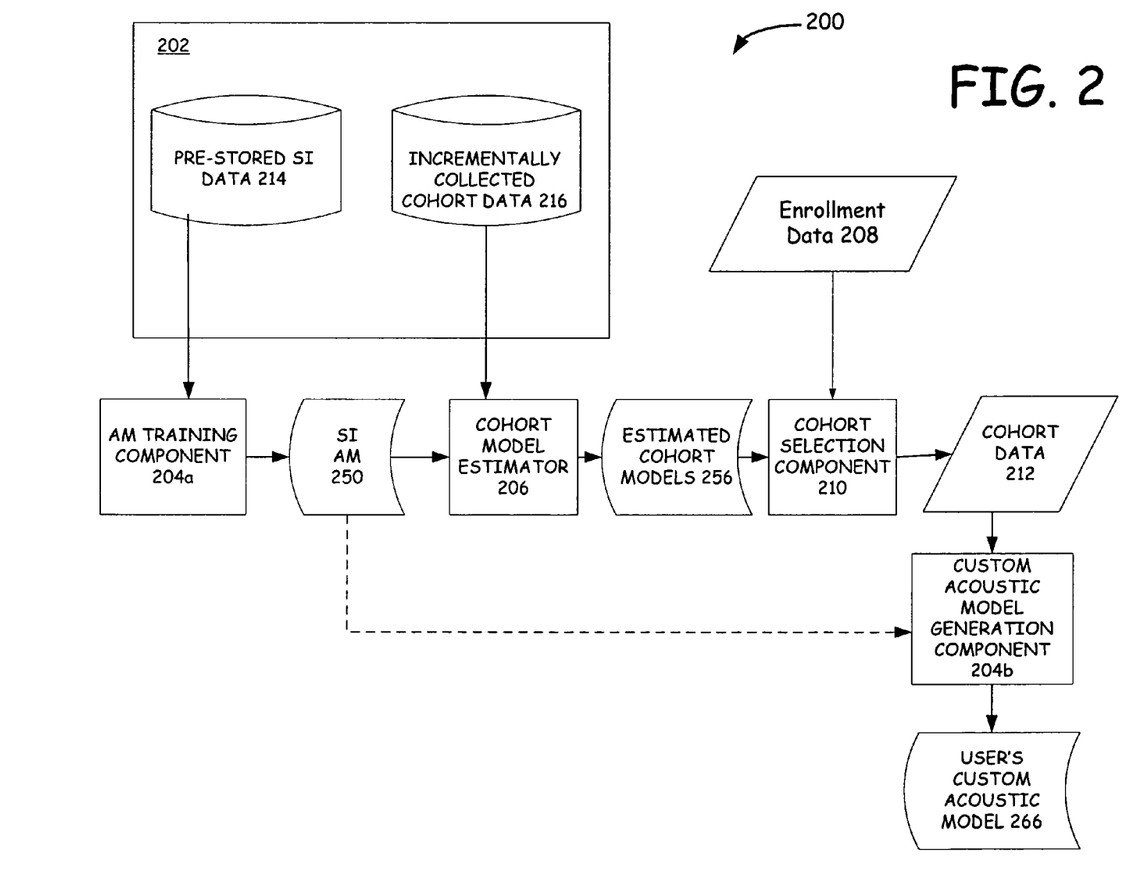
FIG. 2 is a block diagram of a exemplary system used to train an acoustic model.

FIG. 2 is a detailed block diagram of a system 200 used to train acoustic model 140 in accordance with one illustrative embodiment. In one embodiment, portions of the training process are handled by training module 115 of FIG. 1. In this embodiment, system 200 can be used to generate a model that is customized to the user. This custom model is an exemplary description only, and other embodiments can use a general model for all speakers, or have a limited number of models to approximate the various general speakers.

System 200 includes a data store 202, and acoustic model training components 204a and 204b. It should be noted that components 204a and 204b can be the same component used by different portions of system 200, or they can be different components. In some embodiments, components 204a and 204b are components of training module 115 (of FIG. 1). System 200 also includes a model estimator 206, enrollment data 208, selection component 210 and optionally cohort data 212, which is data corresponding to selected cohort models.

FIG. 2 also shows that data store 202 includes pre-stored data 214 as well as incrementally corrected data 216. Pre-stored data 214 may illustratively be a wide variety of commercially available data sets which includes acoustic data and transcriptions indicative of input utterances. The incrementally collected data 216 can include, for example, data from additional speakers which is collected at a later time. Enrollment data 208 is illustratively a set of sentences collected from a user. In training the acoustic model, the acoustic model training component 204a accesses the pre-stored data 214 and trains the acoustic model 250. The user inputs for these samples are then received in the form of the enrollment data 208. Illustratively, enrollment data 208 not only includes an acoustic representation of the user input of the enrollment data, but an accurate transcription of the enrollment data as well. This transcription can be obtained by directing a user to speak predetermined sentences or number strings, and verifying that they spoke the sentences or number strings. Thus, it is possible to know exactly what words corresponded to the acoustic data. Alternatively, other methods of obtaining the transcription can be used as well. For example, the user's speech input to the speech recognition system can be input to the speech recognition system 100 to obtain the transcription.

Model estimator 206 then assesses intermittently collected data 216 which is data from a number of different speakers that may be used for cohort speakers. Based on the acoustic model 250 and the data 216, model estimator 206 estimates a plurality of different models 256.

Each possible model 256 is provided to the selection component 210. The selection component 210 compares the input samples (enrollment data 208) to the estimated models 256. The selection component 210 then selects the speakers that are closest to the enrollment data 208. This can be done using cohorts or any other predetermined similarity measure. Using this data 212, the acoustic model generation component 204b generates an acoustic model 266.

In order to determine the best acoustic model using the available training data, the training system 200 uses minimum classification error (MCE) or similar discriminative training algorithms to develop the acoustic model 140. MCE training is usually formulated as a problem of optimizing a smoothed empirical training set error rate, and a sigmoid function is usually used as the cost function. Recently, it has been shown that the sigmoid function based MCE training can be made equivalent to optimizing an estimated empirical test set error rate using a Parzen window based non-parametric distribution estimation.

In order to develop the present embodiments, a C-class classification problem is considered, where each observation sample x is to be classified into one of the C classes. The objective of the classifier is to design a mapping or decision function F(x) from the observation space x∈x to the discrete set $C_i$=F(x)∈N, i=1,2, ..., C. In MCE, the zero-one risk function $r_{j,i}=\delta(C_i \neq C_j)$ for the cost or risk of classifying a class-j observation into class-i is utilized, and the decision rule used is $$F(x)=C_i \text{ iff } D_i(x;\Lambda) \triangleq G_i(x;\Lambda)-g_i(x;\Lambda)<0, \quad \text{Equation 1}$$

where $g_i(x;\Lambda)$ is a discriminant function for class-i with classifier parameters denoted by $\Lambda$, and an anti-discriminant function is defined as $$G_i(x;\Lambda) = \max_{k \neq i} g_k(x;\Lambda).$$

Given this, the expected overall risk is $$\Re = \int_x [\bar{r}(F(x)|x)]p(x)dx \qquad \text{Equation 2A}$$

$$= \int_x \left[\sum_{j=1}^C \delta[D_j(x;\Lambda) \geq 0]P(C_j|x)\right]p(x)dx \qquad \text{Equation 2B}$$

$$= \sum_{j=1}^C P(C_j) \int_x \delta[D_j(x;\Lambda) \geq 0]p_x(x|C_j)dx \qquad \text{Equation 2C}$$

$$= \sum_{j=1}^C P(C_j) \int_{D_j(x;\Lambda) \geq 0} p_x(x|C_j)dx, \qquad \text{Equation 2D}$$

where $P(C_j) \approx R_j \Big/ \sum_{i=1}^C R_i = R_j/R$.

Figure 3:
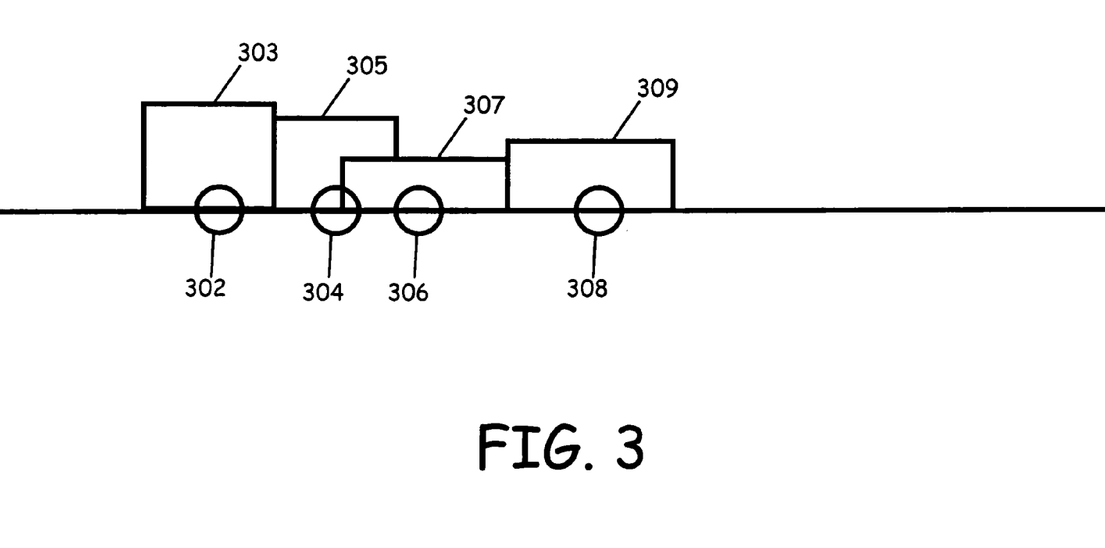
FIG. 3 is a simplified block diagram that illustrates an example scheme for choosing a sample-adaptive window bandwidth.

The problem is now converted from the feature domain to the score domain and the expected Bayes classification risk Equation 2 (2A-2D) becomes $$\Re = \sum_{j=1}^C P(C_j) \int_0^\infty \int_{S:D_j(x)=D_j} \frac{p_x(x|C_j)}{dD_j(x;\Lambda)/dx} dS\, dD_j \qquad \text{Equation 3A}$$

$$= \sum_{j=1}^C P(C_j) \int_0^\infty p_{D_j}(D|C_j)dD, \qquad \text{Equation 3B}$$

where $p_{D_j}(D|C_j) \triangleq \int_{S:D_j(x)=D_j} \frac{p_x(x|C_j)}{dD_j(x;\Lambda)/dx} dS$ is defined as a distribution for a misclassification score for class $C_j$ and can be estimated using the Parzen window $$p_{D_j}(D|C_j) \approx \frac{1}{R_j} \sum_{r=1}^{R_j} \frac{1}{H_r} W_D\left(\frac{D - D_{r,j}}{H_r}\right), \qquad \text{Equation 4}$$

where $D_{r,j}$ is the misclassification score associated with a training data sample (or token, which is a single training sentence or utterance, for example) $x_r$ labeled as class j, $R_j$ is the number of training samples for class j, and $H_r$ is a sample-adaptive window bandwidth (or the bandwidth of a one-dimensional kernel function $W_D$ in the score domain). $H_r$ can be estimated using the distribution of scores for individual tokens. FIG. 3 shows a one-dimensional case for such kernel bandwidth selection with a uniform kernel, where each circle represents a token (302, 304, 306, 308) in a training set, with 303, 305, 307 and 309 being the corresponding windows. In general, any suitable technique for estimating $H_r$ can be used.

As an example, if a symmetric kernel function $$W_D(D) = 1 \Big/ \left[\exp\left(-\frac{D}{2}\right) + \exp\left(\frac{D}{2}\right)\right]^2 \qquad \text{Equation 5}$$

is chosen, Equation 3 (3A, 3B) becomes $$\Re = \sum_{j=1}^C P(C_j) \int_0^\infty \frac{1}{R_j} \sum_{r=1}^{R_j} W_D\left(\frac{D - D_{r,j}}{H_r}\right) dD \qquad \text{Equation 6A}$$

$$= \sum_{j=1}^C \frac{P(C_j)}{R_j} \sum_{r=1}^{R_f} \int_{-\frac{D_{r,f}}{H_r}}^{\infty} W_D(U)dU \qquad \text{Equation 6B}$$

$$= \sum_{j=1}^C \frac{P(C_j)}{R_j} \sum_{r=1}^{R_j} \int_{-\frac{D_{r,f}}{H_r}}^{\infty} \frac{1}{\left[\exp\left(-\frac{U}{2}\right) + \exp\left(\frac{U}{2}\right)\right]^2} dU \qquad \text{Equation 6C}$$

$$= \sum_{j=1}^C \frac{P(C_j)}{R_j} \sum_{r=1}^{R_f} \frac{1}{1 + \exp(-D_{r,j}/H_r)} \qquad \text{Equation 6D}$$

$$= \frac{1}{R} \sum_{j=1}^C \sum_{r=1}^{R_j} \frac{1}{1 + \exp(-D_{r,j}(x_r;\Lambda)/H_r)} \qquad \text{Equation 6E}$$

and the MCE training criteria with sigmoid loss function is obtained. Specifically, the loss function in Equation 6E is $$\frac{1}{1 + \exp[-D_{r,j}(x_r;\Lambda)/H_r]}.$$

Two primary observations can be made from the above. First, the Bayes risk minimization based explanation is more generic. The sigmoid function is just one of the loss functions that can be used in MCE training. Many different loss functions can be derived by choosing different kernel functions $W_D$. Second, the MCE is optimizing an estimated empirical error rate on the true distribution of the data if the training set is representative. In other words, the MCE has some built in generalization ability. This property can also be noticed by examining the sigmoid loss function. If a token is correctly classified but is close to the decision boundary, the cost associated with this token is greater than 0. This means that a similar (but not exact) token in the test set might be misclassified. On other hand, a token that is mis-classified in the training set and is close to the decision boundary would have a cost less than 1, indicating that a similar token in the test set might be correctly classified.

It should be noted that the generalization ability of the MCE training can be further improved through large-margin MCE (LM-MCE), which embeds discriminative margins in the margin-free Bayes risk of Equation 3 (3A, 3B). To develop LM-MCE, the discriminative margin in the score space is defined as a positive value m>0, which represents the extent of the classifier's tolerant gap. This is followed by a modification of the earlier margin-free version of the integration space in Equation 2 (2A-2D): $\{x:D_j(x;\Lambda) \geq 0\}$ to the new, margin-sensitive one: $\{x:D_j(x;\Lambda) \geq -m\}$. As a result, Equation 3 (3A, 3B) is changed to $$\mathcal{R} = \sum_{j=1}^{C} P(C_j) \int_{-\infty}^{\infty} p_{D_j}(D|C_j) dD \quad \text{Equation 7A}$$

$$= \underbrace{\sum_{j=1}^{C} P(C_j) \int_{0}^{\infty} p_{D_j}(D|C_j) dD}_{\text{margin-free Bayes risk}} + \quad \text{Equation 7B}$$

$$\underbrace{\sum_{j=1}^{C} P(C_j) \int_{-m}^{0} p_{D_j}(D|C_j) dD,}_{\text{margin-bound Bayes risk}}$$

with an additional term of "margin-bound" Bayes risk. Equation 6 (6A-6D) is accordingly changed to $$\mathcal{R} = \sum_{j=1}^{C} P(C_j) \int_{-m}^{\infty} \frac{1}{R_j} \sum_{r=1}^{R_j} \frac{1}{H_r} W_D\left(\frac{D - D_{r,j}}{H_r}\right) dD \quad \text{Equation 8A}$$

$$= \sum_{j=1}^{C} \frac{P(C_j)}{R_j} \sum_{r=1}^{R_j} \int_{\frac{-m-D_{r,j}}{H_r}}^{\infty} W_D(U) dU \quad \text{Equation 8B}$$

$$= \sum_{j=1}^{C} \frac{P(C_j)}{R_j} \sum_{r=1}^{R_j} \frac{-1}{(1+\exp U)} \bigg|_{\frac{-m-D_{r,j}}{H_r}}^{\infty} \quad \text{Equation 8C}$$

$$= \sum_{j=1}^{C} \frac{P(C_j)}{R_j} \sum_{r=1}^{R_j} \frac{1}{1+\exp[-(D_{r,j}+m)/H_r]} \quad \text{Equation 8D}$$

$$= \frac{1}{R} \sum_{j=1}^{C} \sum_{r=1}^{R_j} \frac{1}{1+\exp[-(D_{r,j}(x_r; \Lambda)+m)/H_r]} \quad \text{Equation 8E}$$

$$= \frac{1}{R} \sum_{j=1}^{C} \sum_{r=1}^{R_j} \frac{1}{1+\exp[-(D_{r,j}(x_r; \Lambda)+m)/H_r]} \quad \text{Equation 8F}$$

The loss function in Equation 8F is $$\frac{1}{1+\exp[-(D_{r,j}(x_r; \Lambda)+m)/H_r]}.$$

Figure 4:
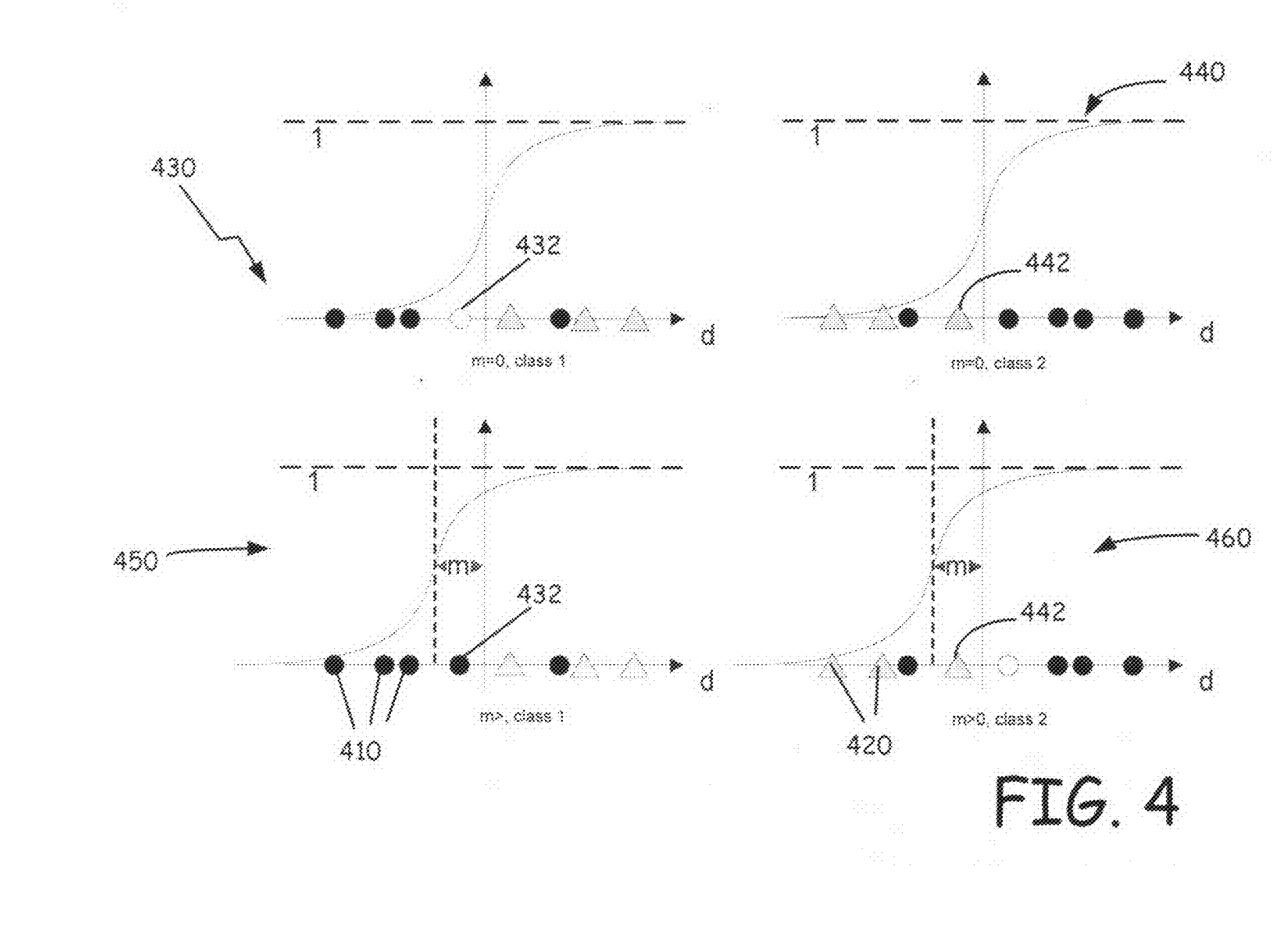
FIG. 4 is an example series of plots of sigmoid functions illustrating large-margin minimum classification (LM-MCE) results for given tokens with and without a margin.

The margin-sensitive Bayes risk in the form of Equation 8 (8A-8F) can be viewed as a principled extension to the MCE in two ways. First, the slope of the sigmoid loss function, $1/H_r$, in MCE can be adaptive to each training sample, i.e., $H_r$ is dependent with the r-th training sample. Second, a non-zero valued discriminative margin, m, is introduced to improve the gap tolerance and generalization ability of the classifier. As in the case of the present MCE embodiments, the LM-MCE criteria can be easily extended when other kernel functions are used. MCE training can be carried out using either the generalized probabilistic descent (GPD) or extended Baum Welch (EBW) method, both of which update the HMM parameters based on the derivatives of the loss function. The introduction of the margin does not change the basic parameter updating algorithms. However, setting a fixed large margin as described above may introduce additional outlier tokens (tokens that are far from the center of the loss function and have no effect in adjusting model parameters) and thus negatively impact the training performance. This is described in connection with FIG. 4, which illustrates a two-class special case for the use of discriminative margins in LM-MCE. In FIG. 4, Tokens shaped as circles 410 are from class 1 and those represented as triangles 420 are from class 2. In the upper sub-figures (430 and 440), margins are set to 0, while in the lower sub-figures (450 and 460) margins are set to a positive value. As can be seen, the token represented by circle 432 in the upper-left sub-figure 430 is not an outlier token. However, when the margin is set to a fixed large value, it becomes an outlier token as indicated in the lower-left sub-figure 460. A similar process occurs with triangle token 442 is similarly situated with the introduction of a margin in plot 360. To overcome this drawback, using gradually increased margins over iterations is proposed. In other words, the margin is originally set to 0 or even negative and then increased over iterations. The training process (as well as the change of the margin) stops when the minimum word error rate (WER) on the development set is achieved.

An example of the implementation of the techniques described above is illustrated below in connection with the training of a large-scale speech recognition system. For this training process, the entire training set utilized includes 26 separate corpuses, about 2.7 million utterances, and a total of around 2000 hours of speech data. To improve the robustness of acoustic models, data are collected through various channels including close-talk telephones, far-field microphones, and cell phones. Speech data are recorded under various conditions with different environmental noises. Both native English speakers and speakers with various foreign accents are included. The text prompts include common telephony-application style utterances and some dictation-style utterances from the Wall Street Journal speech database.

The model evaluation is conducted on several typical context free grammar (CFG) based commercial telephony ASR tasks. In order to examine the generalization ability of the approach, database-independent tests are conducted, (that is, the test data are collected by vendors that have not contributed to the training database).

The size of the delivered vocabulary of the ASR system is 120K. However, the actual vocabulary used for different tests varies from one set to another. Table 1 summarizes the test sets used in the experiments.

TABLE 1

Description of the test sets

| Name | Vocabulary Size | Word Count | Description |
| --- | --- | --- | --- |
| MSCT | 70K | 4356 | General call center application. |
| STK | 40K | 12851 | Finance applications (stock transaction, etc.) |
| QSR | 55K | 5718 | Name dialing application (note: pronunciations of most names are generated by letter-to-sound rules). |

In the experiments, all data are sampled at a rate of 8K Hz. Phonetic decision trees are used for state tying and there are about 6000 tied states with an average of 16 Gaussian mixture components per state. The 52-dimensional raw acoustic feature vectors are composed of the normalized energy, 12 Mel-Frequency Cepstrum Coefficients (MFCCs) and their first, second and third order time derivatives. The 52-dimensional raw features are further projected to form 36-dimensional feature vectors via heteroscedastic linear discriminant analysis (HLDA) transformation.

The baseline uses maximum likelihood (ML) trained HMMs. The LM-MCE training is performed upon the ML-trained model. In the large-margin MCE training, the training data is decoded by a simple unigram weighted context-free grammar (CFG) and the competitors are updated every three iterations. In the training process the window bandwidth H, is set to 30. Of course, as described earlier, a variable-size window could be used in accordance with the present embodiments. All HMM model parameters (except transition probabilities) are updated. Only two epochs of training are performed in the LM-MCE training: the first epoch is performed with m=0 and takes three iterations and the second epoch is performed with m=6 and also takes three iterations. Due to the high cost of training on such a large database, tweaking and tuning of the system are substantially limited. It is possible to obtain better performance by fine tune these training parameters if resource permits. A growth transformation based training algorithm is used for fast convergence.

In order to prevent variance underflow, a dimension dependent variance floor is set to be ¹⁄₂₀ of the average variance over all Gaussian components along that dimension. Variance values that are less than the variance floor are set to that floor value.

The WER on the three database-independent test sets are presented in Table 2 further below. Compared with the ML baseline, the conventional MCE training can reduce the WER by 11.58%. LM-MCE training further reduces the WER and achieves 16.57% WER reduction over the ML baseline across three test sets. The results shown in Table 2 demonstrate that the LM-MCE training approach has strong generalization ability in large-scale ASR tasks as well as in small-scale tasks.

TABLE 2

Experimental results on the three database-independent telephony ASR test sets

| | Test Set | ML | MCE | LM-MCE |
|---|---|---|---|---|
| MSCT | WER | 12.413% | 10.514% | 10.009% |
| | Abs. WERR | — | 1.899% | 2.404% |
| | Rel. WERR | — | 15.30% | 19.37% |
| STK | WER | 7.993% | 7.330% | 6.926% |
| | Abs. WERR | — | 0.663% | 1.067% |
| | Rel. WERR | — | 8.30% | 13.35% |
| QSR | WER | 9.349% | 8.464% | 7.887% |
| | Abs. WERR | — | 0.885% | 1.4625 |
| | Rel. WERR | — | 9.47% | 15.64% |
| Average | WER | 9.918% | 8.769% | 8.274% |
| | Abs. WERR | — | 1.149% | 1.644% |
| | Rel. WERR | — | 11.58% | 16.57% |

The experimental results demonstrate that the LM-MCE is not only suitable for small-vocabulary ASR tasks (such as TIDIGITS) but is also well suited for large-scale model training and can achieve significant performance improvement on large-scale ASR tasks.

Figure 5A:
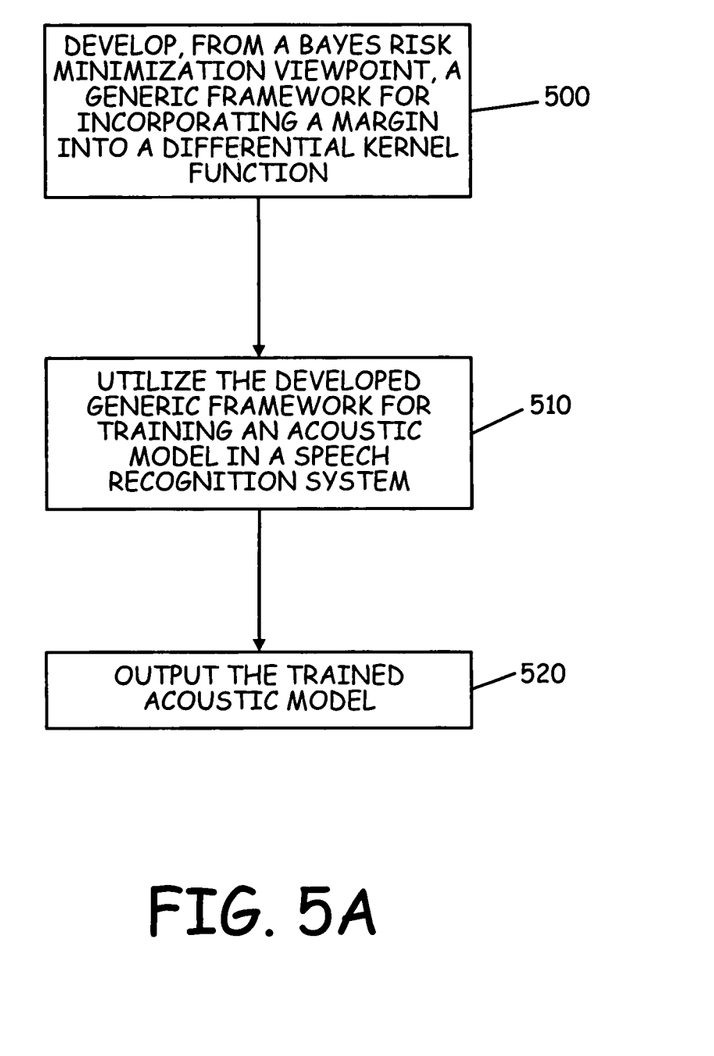
FIG. 5A is a flow diagram illustrating a general method of training of an acoustic model according to one embodiment.
Figure 5B:
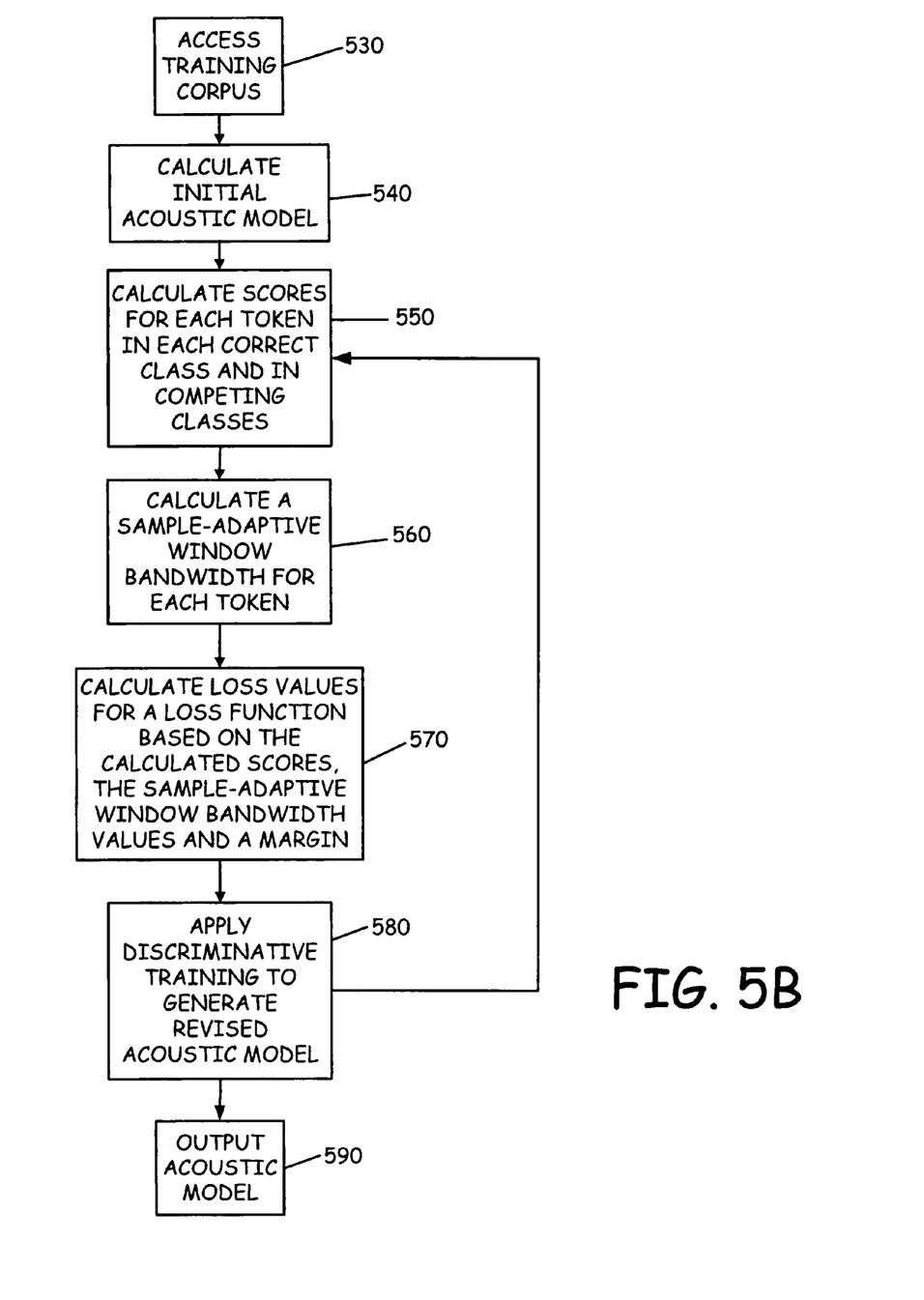
FIG. 5B is a flow diagram illustrating steps of a more specific method of training of an acoustic model according to one embodiment.

In conclusion, referring now to FIGS. 5A and 5B, flow diagrams are provided to briefly illustrate a general process and a more specific process, respectively, of training an acoustic model in accordance with the present embodiments. In the general process of FIG. 5A, at step 500, from a Bayes risk minimization viewpoint, a generic framework for incorporating a margin into a differential kernel function is developed. At step 510, the developed generic framework is utilized for training an acoustic model in a speech recognition system. At step 520, the trained acoustic model is output.

In the more specific process of FIG. 5B, first, a training data corpus is accessed or otherwise provided to the training module 115. This is illustrated at step 530. Then the training module 115 calculates an initial acoustic model using the training corpus. This is illustrated at step 540. Once the initial acoustic model is created, the system calculates scores for each token with regard to a correct class and competing classes from the initial acoustic model. The calculation of this score can in some embodiments be accomplished through the use of Equation 4, above. This is illustrated at step 550. At step 560, a sample-adaptive window bandwidth for each training token is calculated as described earlier. Once the scores and the sample-adaptive window bandwidths have been calculated, a value for the loss function, which includes a value for margin, is calculated. This is illustrated at step 570. As discussed above, the margin can be a fixed value, or can vary over each iteration of the training process. Once the value for the loss function has been calculated the parameters in the initial acoustic model are updated to create a revised acoustic model. This is illustrated at step 580. Steps 550 to 580 are repeated until either a predetermined number of iterations have passed or empirical convergence is achieved. Once the process is finished the final revised acoustic model is output at step 590. It should be noted that, even without the use of a margin in the loss function (or when the margin in the loss function is set to zero), the incorporation of the sample-adaptive window bandwidth into the loss function improves the generalization capability of the acoustic model training algorithm.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of training an acoustic model in a speech recognition system, comprising:
    utilizing a training corpus, having training tokens, to calculate an initial acoustic model;
    computing, using the initial acoustic model, a plurality of scores for each training token with regard to a correct class and a plurality of competing classes;
    utilizing a symmetric kernel function that is based on an exponent of the plurality of scores to calculate a sample-adaptive window bandwidth for each training token;
    utilizing a loss function to calculate a margin for each training token;
    gradually increasing the margin for each training token over a number of iterations until a minimum word error rate is achieved;
    determining derivatives of the loss function based on the computed scores, based on the calculated sample-adaptive window bandwidth for each training token, and based on the iteratively increased margin for each training token;
    calculating a Bayes risk value that includes a margin-free Bayes risk component and a margin-bound Bayes risk component, the margin-free Bayes risk component being based on an integral computed from zero to infinity, and the margin-bound Bayes risk component being based on an integral computed from a negative value of a discriminative margin to zero;
    updating parameters in the initial acoustic model to create a revised acoustic model based upon the derivatives of the loss function and the Bayes Risk value; and
    outputting the revised acoustic model.

2. The method of claim 1 wherein deriving the loss function from a Bayesian viewpoint further comprises utilizing a margin-free Bayes risk function.

3. The method of claim 2 wherein deriving the loss function from a Bayesian viewpoint further comprises incorporating a margin-bound Bayes risk function in addition to utilizing the margin-free Bayes risk function.

4. The method of claim 1 wherein the margin for each training token increases with each iteration.

5. The method of claim 4 and further comprising:
repeating the steps of computing, calculating, determining and updating until an empirical convergence has been met for the revised acoustic model.

6. The method of claim 4 wherein the margin for each training token is initially set to zero.

7. The method of claim 4 wherein the margin for each training token is initially set to a value greater than zero.

8. The method of claim 4 wherein the margin for each training token is initially set to a value less than zero.

9. A system for training an acoustic model comprising:
a training corpus having training tokens;
a classifier that utilizes a zero-one risk function to calculate a cost of classifying each of the training tokens into an incorrect class, the zero-one risk function having a discriminant function and an anti-discriminant function that convert the costs for the training tokens from a feature domain to a score domain;
enrollment data that includes an acoustic representation of a user voice input and a corresponding transcription of the user voice input;
a Bayes risk value that includes a margin-free Bayes risk component and a margin-bound Bayes risk component, the margin-free Bayes risk component being based on an integral computed from zero to infinity, and the margin-bound Bayes risk component being based on an integral computed from a negative value of a discriminative margin to zero:
a training component that utilizes a discriminative training algorithm to generate an acoustic model based on the training corpus, the enrollment data, the classifier, the Bayes risk value, and a loss function that is calculated based on calculated scores of closeness and a calculated sample-adaptive window bandwidth for each training token, the sample-adaptive window bandwidth for each training token being estimated utilizing a distribution of scores for the training tokens, the discriminative training algorithm optimizing an error rate associated with the training tokens based on a slope of the loss function that is adapted to each training token, and the acoustic model including Hidden Markov Model parameters that are updated based on derivatives of the loss function.

10. The system of claim 9 wherein the loss function is calculated based additionally on a margin, and wherein the loss function comprises a sigmoid loss function.

11. The system of claim 9 wherein the training component is configured to generate a series of revised acoustic models until an empirical convergence is achieved, and wherein the loss function is based on an exponent of the sample-adaptive window bandwidth.

12. The system of claim 9 further comprising:
speaker independent data;
incrementally collected cohort data; and
wherein the training component is configured to use the speaker independent data in conjunction with the training corpus, the incrementally corrected cohort data, and the enrollment data to generate the acoustic model.

13. The system of claim 12 wherein the training component generates a custom acoustic model for each speaker.

14. The system of claim 10 wherein the margin is a fixed value.

15. The system of claim 10 wherein the margin is greater than zero.

16. A method comprising:
calculating an initial acoustic model for a speech recognition system;
developing, from a Bayes risk minimization viewpoint, a generic framework for incorporating a margin into a differential kernel function, the differential kernel function being a symmetric kernel function that is exponentially based on a misclassification score, the misclassification score being estimated utilizing a bandwidth of the differential kernel function in a score domain;
deriving, using the developed generic framework, a loss function that incorporates the margin, the misclassification score, and the bandwidth of the differential kernel function in the score domain;
calculating a Bayes risk value that includes a margin-free Bayes risk component and a margin-bound Bayes risk component, the margin-free Bayes risk component being based on an integral computed from zero to infinity, and the margin-bound Bayes risk component being based on an integral computed from a negative value of a discriminative margin to zero;
utilizing the derived loss function and the Bayes risk value to update parameters of the initial acoustic model to create a revised acoustic model; and
outputting the revised acoustic model.

17. The method of claim 16 wherein the initial acoustic model includes Hidden Markov Model parameters, wherein the revised acoustic model includes revised Hidden Markov Model parameters, wherein the margin-free Bayes risk component is calculated utilizing an equation, $$\Sigma_{j=1}^{C} P(C_j) \int_0^\infty p_{D_j}(D|C_j) dD$$

and wherein the margin-bound Bayes risk component is calculated utilizing an equation, $$\Sigma_{j=1}^{C} P(C_j) \int_{-m}^0 p_{D_j}(D|C_j) dD.$$

18. The method of claim 16 wherein utilizing the derived loss function to update the parameters of the initial acoustic model comprises carrying out, using the derived loss function, an iterative training process in which the revised acoustic model is further refined until an empirical convergence is achieved, and wherein the derived loss function is calculated utilizing an equation, $$\frac{1}{1+\exp[-(D_{r,j}(x_r:\Lambda)+m)/H_r]}$$

wherein $D_{r,j}$ is the misclassification score, $H_r$ is the bandwidth of the differential kernel function in the score domain, and m is the margin.

19. The speech recognition system of claim 18 wherein the margin of the loss function varies with each iteration of the training process.

* * * * *